(12) United States Patent
Lecomte et al.

(10) Patent No.: US 9,051,221 B2
(45) Date of Patent: Jun. 9, 2015

(54) AQUEOUS EMULSIONS OF ALKYLALKOXYSILANES

(75) Inventors: Jean-Paul H. Lecomte, Brussels (BE); Yihan Liu, Midland, MI (US); David Brian Selley, Bay City, MI (US)

(73) Assignee: Dow Corning Corporation, Midland, MI (US)

( * ) Notice: Subject to any disclaimer, the term of this patent is extended or adjusted under 35 U.S.C. 154(b) by 182 days.

(21) Appl. No.: 13/515,321

(22) PCT Filed: Dec. 22, 2010

(86) PCT No.: PCT/US2010/061739
§ 371 (c)(1),
(2), (4) Date: Jun. 12, 2012

(87) PCT Pub. No.: WO2011/087829
PCT Pub. Date: Jul. 21, 2011

(65) Prior Publication Data
US 2012/0247363 A1    Oct. 4, 2012

Related U.S. Application Data

(60) Provisional application No. 61/288,905, filed on Dec. 22, 2009, provisional application No. 61/288,898, filed on Dec. 22, 2009.

(51) Int. Cl.

| | | |
|---|---|---|
| *C04B 41/49* | (2006.01) | |
| *C04B 24/42* | (2006.01) | |
| *C04B 28/02* | (2006.01) | |
| *C04B 28/14* | (2006.01) | |
| *C04B 41/63* | (2006.01) | |
| *C04B 41/64* | (2006.01) | |
| *C04B 40/00* | (2006.01) | |
| *C04B 41/00* | (2006.01) | |
| *C04B 111/27* | (2006.01) | |

(52) U.S. Cl.
CPC ......... *C04B 41/4922* (2013.01); *C04B 41/4966* (2013.01); *C04B 24/42* (2013.01); *C04B 28/02* (2013.01); *C04B 28/14* (2013.01); *C04B 40/0039* (2013.01); *C04B 41/009* (2013.01); *C04B 41/64* (2013.01); *C04B 2111/27* (2013.01)

(58) Field of Classification Search
CPC ............ C04B 41/4922; C04B 41/4944; C04B 41/4966; C04B 41/009; C04B 41/64; C04B 24/42; C04B 28/02; C04B 28/14; C04B 40/0039; C04B 2111/27
USPC .................................................. 106/287.11
See application file for complete search history.

(56) References Cited

U.S. PATENT DOCUMENTS

| | | | | |
|---|---|---|---|---|
| 5,226,954 | A | * | 7/1993 | Suzuki .............................. 106/2 |
| 5,286,766 | A | | 2/1994 | Arai et al. |
| 5,411,585 | A | * | 5/1995 | Avery et al. ................. 106/287.1 |
| 5,421,866 | A | * | 6/1995 | Stark-Kasley et al. ........... 106/2 |
| 5,798,144 | A | * | 8/1998 | Varanasi et al. .............. 427/384 |
| 5,936,703 | A | * | 8/1999 | Miyazaki et al. ......... 351/159.02 |
| 6,632,805 | B1 | * | 10/2003 | Liebeskind et al. ............ 514/63 |
| 6,878,770 | B2 | * | 4/2005 | Herzig et al. .................. 524/588 |
| 7,063,736 | B2 | * | 6/2006 | Neumann et al. ........ 106/287.11 |

(Continued)

FOREIGN PATENT DOCUMENTS

| | | |
|---|---|---|
| CN | 101541889 A | 9/2009 |
| JP | 03-159975 A | 7/1991 |

(Continued)

OTHER PUBLICATIONS

I. Danielsson et al.: The definition of Microemulsion, Colloids and Surfaces, vol. 3, 1981, pp. 391-392.
English language abstract not found; however, see English language equivalent US20030129419. Original document extracted from espacenet.com database on Apr. 10, 2014, 72 pages.
English language abstract for JPH03159975 extracted from espacenet.com database on Apr. 10, 2014, 6 pages.
English language abstract for JPH04164877 extracted from espacenet.com database on Apr. 10, 2014, 7 pages.
English language abstract for CN 101541889 extracted from espacenet.com database on Jul. 2, 2014, 1 page.
English language abstract for JP 03-159975 extracted from PAJ database on Jul. 2, 2014, 1 page.

*Primary Examiner* — David M Brunsman
(74) *Attorney, Agent, or Firm* — Baltazar Gomez (57) ABSTRACT

An aqueous emulsion for waterproofing a surface comprising:
a) 1 to 85% by weight of an alkylalkoxysilane of the formula $R^1_a Si(OR^2)_{4-a}$
b) 0.1 to 10% by weight of a cationic alkoxysilane of the formula $R^3_b R^4 Si(OR^5)_{3-b}$
c) up to 20% by weight of a hydroxy terminated polydimethylsiloxane having a degree of polymerization from 1 to 500, said hydroxy terminated polydimethylsiloxane being present in the aqueous emulsion
where;
$R^1$ is an alkyl group containing 1 to 30 carbon atoms,
$R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
$R^3$ is an alkyl group containing 1 to 4 carbons,
$R^4$ is a monovalent hydrocarbon having at least one quaternary ammonium group substituent,
a is 1 or 2, b is 0, 1 or 2.

29 Claims, 8 Drawing Sheets

(56) References Cited

U.S. PATENT DOCUMENTS

| | | | |
|---|---|---|---|
| 7,884,089 B2 * | 2/2011 | Gimvang | 514/63 |
| 8,470,925 B2 * | 6/2013 | Liu et al. | 524/588 |
| 2003/0129419 A1 | 7/2003 | Chen | |
| 2007/0010419 A1 * | 1/2007 | Ohlhausen et al. | 510/368 |
| 2011/0271873 A1 * | 11/2011 | Ohlhausen et al. | 106/287.11 |
| 2012/0282210 A1 * | 11/2012 | Henning et al. | 424/70.122 |

FOREIGN PATENT DOCUMENTS

| | | |
|---|---|---|
| JP | H03159975 A | 7/1991 |
| JP | H04164877 A | 6/1992 |
| JP | 2005507960 A | 3/2005 |

* cited by examiner

Figure 1

Water absorbed (%) by the untreated and treated Fiber Reinforced Concrete blocs of Example 3

Figure 2

The evolution of the water uptake as a function of the immersion time for the mortar treated samples of Example 4

Figure 3

Phase diagram for the compositions of Example 7 immediately after made

Figure 4

Phase diagram for the compositions of Example 7 one day after made

Figure 5

Phase diagram for the compositions of Example 7 one week after made

Figure 6

Phase diagram for the compositions of Example 8 immediately after made

Figure 7

Phase diagram for the compositions of Example 8 one day after made

Figure 8

Phase diagram for the compositions of Example 8 one week after made

AQUEOUS EMULSIONS OF ALKYLALKOXYSILANES

CROSS REFERENCE TO RELATED APPLICATIONS

This application is a U.S. national stage filing under 35 U.S.C. §371 of PCT Application No. PCT/US10/61739 filed on Dec. 22,2010, currently pending, which claims the benefit of U.S. Provisional Patent Application No. 61/288,905 filed Dec. 22, 2009 and U.S. Provisional Patent Application No. 61/288,898 filed Dec. 22, 2009 under 35 U.S.C. §119 (e). PCT Application No. PCT/US10/61739, U.S. Provisional Patent Application No. 61/288,905 and U.S. Provisional Patent Application No. 61/288,898 are hereby incorporated by reference.

TECHNICAL FIELD

This disclosure relates to aqueous emulsions of certain alkylalkoxysilanes and cationic alkoxysilanes. The disclosed emulsions provide water proofing properties to a variety of substances, and in particular to masonry or concrete surfaces.

BACKGROUND

Alkylalkoxysilanes are useful for rendering various surfaces hydrophobic or water repellent. However, long chain (≥C4) alkylalkoxysilane do not readily disperse into water. Thus in order to prepare water based products or application of these materials, they are often provided as aqueous emulsions. However, such emulsions typically require the addition of surfactants along with an energy and equipment intensive shear mixing process for their formation. The presence of surfactants in the emulsion may limit the waterproofing ability of subsequent coatings formed from these emulsions. That is, the resulting coating will still contain "loose" surfactant. Most surfactants have a certain affinity towards water, so when the treated substrate is re-exposed to water or water moisture, any loose surfactant can attract water, and sometimes can even re-disperse protective oil ingredients which were coated on the substrate, back to water, thus defeating the purpose of waterproofing. Furthermore, emulsions of alkylalkoxysilanes often require the addition of certain catalysts to accelerate the water proofing process upon application to a surface.

Thus, a need exists to provide emulsions of alkylalkoxysilanes that do not contain surfactants which are detrimental to the water proofing process. A further need exists to provide such emulsions that are easily prepared. That is, they form readily without needing special equipment or energy intensive processes. Finally, a yet further need exists to identify emulsions that provide waterproofing coatings that do not require the addition of any catalysts.

SUMMARY

The present inventors have found certain combinations of alkylalkoxysilanes and cationic alkoxysilanes that self-disperse into water to form an emulsion without the need to use co-surfactants, nor any type of energy intense emulsifying equipment. The present emulsions provide water proofing properties to a variety of substances, and in particular to masonry or concrete surfaces, without requiring the addition of cure catalysts.

DETAILED DESCRIPTION

The present invention provides an aqueous emulsion comprising:
a) 1 to 85% by weight of an alkylalkoxysilane of the formula $$R^1{}_a Si(OR^2)_{4-a}$$

b) 0.1 to 10% by weight of a cationic alkoxysilane of the formula $$R^3{}_b R^4 Si(OR^5)_{3-b}$$

c) 0 to 20% by weight of an organopolysiloxane comprising the formula $$(R_2 R^6 SiO_{1/2})_v (R_2 SiO_{2/2})_x (RSiO_{3/2})_y$$

where;
R is a monovalent hydrocarbon group containing 1 to 20 carbons,
$R^1$ is an alkyl group containing 1 to 30 carbon atoms,
$R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
$R^3$ is an alkyl group containing 1 to 4 carbons,
$R^4$ is a monovalent hydrocarbon having at least one quaternary ammonium group substituent,
$R^6$ is an alkyl group containing 1 to 4 carbon atoms or a hydroxy group,
a is 1 or 2,
b is 0, 1 or 2,
v≥0, x≥0, y≥0, with the proviso that not all v, x, and y are zero in the same formula wherein;
the weight ratio of components a/b is ≥4,
the combined weight of (a), (b) and (c) is no greater than 95% of the emulsion and,
the emulsion is essentially free of any co-surfactants.

As used herein "aqueous emulsion" refers to emulsions having a water continuous phase.

The present invention further relates to an aqueous microemulsion comprising:
a) 1 to 90% by weight of an alkylalkoxysilane of the formula $$R^1{}_a Si(OR^2)_{4-a}$$

b) 0.1 to 90% by weight of a cationic alkoxysilane of the formula $$R^3{}_b R^4 Si(OR^5)_{3-b}$$

where;
$R^1$ is an alkyl group containing 1 to 30 carbon atoms,
$R^2$ and $R^5$ are independently selected from the group consisting of hydrogen, alkyl groups containing 1 to 4 carbon atoms, CH$_3$C(O)—, CH$_3$CH$_2$C(O)—, HOCH$_2$CH$_2$—, CH$_3$OCH$_2$CH$_2$—, and C$_2$H$_5$OCH$_2$CH$_2$—, R$^3$ is an alkyl group containing 1 to 4 carbons, R$^4$ is a monovalent hydrocarbon having at least one quaternary ammonium group substituent, a is 1 or 2, b is 0, 1 or 2, wherein;

the combined weight of (a) and (b) is no greater than 95% of the microemulsion and, the emulsion is essentially free of any co-surfactants.

As used herein "microemulsion" refers to a solution or an emulsion that is essentially clear or transparent to the naked eye. As such it encompasses two scientific meanings. In the first, a microemulsion is a system of water, oil, and amphiphile, which is a single optically isotropic and thermodynamically stable liquid solution (I. Danielsson, B. Lindman, "The Definition of Microemulsion", *Colloids Surfaces* 3, 1981, 391.) In the second, a microemulsion is an emulsion—a heterogeneous system where one liquid phase is dispersed in another liquid—with the dispersed phase having a particle size small enough that it does not scatter visible light or appears clear. For the latter, an emulsion having a particle size less than 100 nm typically appears transparent or translucent. "Microemulsion" in the present invention refers to either and both of these meanings.

The present emulsions are essentially free of any co-surfactants. While not wishing to be bound by any theory, the present inventors believe the cationic alkoxysilane is able to function as a surfactant to form and stabilize an emulsion of the alkylalkoxysilane. As such, the addition of further surfactants or co-surfactants is not necessary. As used herein "essentially free of co-surfactant" means the exclusion of the purposeful addition of a surfactant or co-surfactant in quantities greater than 1000 ppm to the present emulsions. It is recognized some minor quantities of co-surfactant may be present in the inventive compositions due to impurities or by addition of such for other unintended uses.

a) The Alkylalkoxysilane

Component a) is an alkylalkoxysilane of the formula $$R^1{}_a Si(OR^2)_{4-a}$$

where R$^1$ is an alkyl group containing 1 to 30 carbon atoms, R$^2$ is selected from the group consisting of hydrogen, alkyl groups containing 1 to 4 carbon atoms, CH$_3$C(O)—, CH$_3$CH$_2$C(O)—, HOCH$_2$CH$_2$—, CH$_3$OCH$_2$CH$_2$—, and C$_2$H$_5$OCH$_2$CH$_2$—, the subscript "a" is 1 or 2. In the formula, R$^1$ represents an alkyl group having 1-30 carbon atoms, alternatively 1-12 carbon atoms, alternatively 3-10 carbon atoms, alternatively 6-9 carbon atoms, or alternatively 8 carbon atoms.

Component a) may be a single alkylalkoxysilane or a mixture of alkylalkoxysilanes, as described above. Some suitable alkoxysilanes are methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltriethoxysilane, hexyltrimethoxysilane, n-octyltriethoxysilane, dimethyldimethoxysilane, dimethyldiethoxysilane, diethyldimethoxysilane, diisobutyldimethoxysilane, dibutyldiethoxysilane, dihexyldimethoxysilane.

Such alkylalkoxysilanes are known and are commercially available. Representative examples are described in U.S. Pat. No. 5,300,327 (Apr. 5, 1994), U.S. Pat. No. 5,695,551 (Dec. 9, 1997), and U.S. Pat. No. 5,919,296 (Jul. 6, 1999).

In one embodiment of the aqueous emulsions, R$^1$ is n-octyl, and R$^2$ is ethyl, that is component a) is n-octyl triethoxysilane.

In one embodiment of the microemulsions, R$^1$ and R$^2$ is methyl, that is component a) is methyltrimethoxysilane.

In another embodiment of the microemulsions, R$^1$ is propyl and R$^2$ is methyl, that is component a) is propyltrimethoxysilane.

b) The Cationic Alkoxysilane

Component b) is a cationic alkoxysilane of the formula $$R^3{}_b R^4 Si(OR^5)_{3-b}$$

where; R$^3$ is an alkyl group containing 1 to 4 carbons, such as methyl, ethyl, propyl, or butyl, R$^4$ is a monovalent hydrocarbon group having at least one quaternary ammonium group substituent, R$^5$ is selected from the group consisting of hydrogen, alkyl groups containing 1 to 4 carbon atoms, CH$_3$C(O)—, CH$_3$CH$_2$C(O)—, HOCH$_2$CH$_2$—, CH$_3$OCH$_2$CH$_2$—, and C$_2$H$_5$OCH$_2$CH$_2$—, the subscript "b" is 0, 1 or 2, alternatively "b" is 0.

The monovalent hydrocarbon group R$^4$ in the cationic alkoxysilane formula may have the formula —R$^7$N$^+$R$^8$R$^9$R$^{10}$X, where;

R$^7$ links to the silicon atom of the cationic alkoxysilane formula and is a linear or branched alkylene group containing 1 to 4 carbon atoms, such methylene, ethylene, propylene, butylene, or isobutylene. Alternatively, R$^7$ is propylene or isobutylene, R$^8$, R$^9$, and R$^{10}$ are independently selected from hydrocarbon groups containing 1 to 20 carbon atoms, providing the total number of carbon atoms from R$^8$, R$^9$, and R$^{10}$ is at least 6 carbon atoms, X is selected from a halide; such as fluoride, chloride, bromide, or iodide, acetate, or tosylate.

Representative, non-limiting examples of the R$^4$ substituent include;

—(CH$_2$)$_3$N$^+$(C$_4$H$_9$)$_3$Cl$^-$

—(CH$_2$)$_3$N$^+$(C$_4$H$_9$)$_3$Br$^-$

—(CH$_2$)$_3$N$^+$(CH$_3$)$_2$C$_{14}$H$_{29}$Cl$^-$

—(CH$_2$)$_3$N$^+$CH$_3$(C$_{10}$H$_{21}$)$_2$Cl$^-$

—(CH$_2$)$_3$N$^+$(CH$_3$)$_2$CH$_2$C$_6$H$_5$Cl$^-$

—(CH$_2$)$_3$N$^+$(CH$_3$)$_2$CH$_2$CH$_2$OHCl$^-$

—(CH$_2$)$_3$N$^+$(C$_2$H$_5$)$_3$Cl$^-$

—(CH$_2$)$_3$N$^+$(CH$_3$)$_2$C$_{12}$H$_{25}$Cl$^-$

—(CH$_2$)$_3$N$^+$(CH$_3$)$_2$C$_{18}$H$_{37}$Cl$^-$

—(CH$_2$)$_3$N$^+$(CH$_3$)$_2$C$_{18}$H$_{37}$Br$^-$

—(CH$_2$)$_3$N$^+$(C$_{10}$H$_{21}$)$_2$CH$_3$Br$^-$

Cationic alkoxysilanes are known and many are available commercially. Exemplary commercial examples include; Dow Corning® 5700, 5772, and Q9-6346.

In one embodiment, R$^3$ and R$^5$ are methyl and R$^4$ is —(CH$_2$)$_3$N$^+$(CH$_3$)$_2$C$_{18}$H$_{37}$Cl$^-$ in the cationic alkoxysilane formula.

c) The Organopolysiloxane

Component c) is an organopolysiloxane comprising the formula $$(R_2R^6SiO_{1/2})_v(R_2SiO_{2/2})_x(RSiO_{3/2})_y$$

where R is a monovalent hydrocarbon group containing 1 to 20 carbons,

R$^6$ is an alkyl group containing 1 to 4 carbon atoms or a hydroxy group, and v≥0, x≥0, y≥0, with the proviso that not all v, x, and y are zero in the same formula.

R may be a substituted or unsubstituted aliphatic or aromatic hydrocarbyl. Monovalent unsubstituted aliphatic hydrocarbyls are exemplified by, but not limited to alkyl groups such as methyl, ethyl, propyl, pentyl, octyl, undecyl, and octadecyl and cycloalkyl groups such as cyclohexyl. Monovalent substituted aliphatic hydrocarbyls are exemplified by, but not limited to halogenated alkyl groups such as chloromethyl, 3-chloropropyl, and 3,3,3-trifluoropropyl. The aromatic hydrocarbon group is exemplified by, but not limited to, phenyl, tolyl, xylyl, benzyl, styryl, and 2-phenylethyl.

Typically, the organopolysiloxane is a hydroxy terminated polydimethylsiloxane of the formula $(Me_2(OH)SiO_{1/2})(Me_2SiO_{2/2})_x(Me_2(OH)SiO_{1/2})$ having a degree of polymerization (x) from 1 to 500, alternatively, from 5 to 200, or alternatively from 10 to 100.

In another embodiment, the organopolysiloxane may be a "DT" organopolysiloxane containing siloxy units having the general formula $(R_2SiO_{2/2})_x(RSiO_{3/2})_y$, where R, x and y are as defined above. In this embodiment, R is typically methyl and x ranges from 1 to 500, alternatively, from 10 to 200, and y ranges from 1 to 200, alternatively, from 5 to 100.

The amounts of components (a), (b), and (c) in the emulsion composition are such that the weight ratio of components a/b is ≥4 and the combined weight of (a), (b) and (c) is no greater than 95% of the emulsion, with the remaining balance of the emulsion being water or an aqueous based solution. Alternatively, the weight ratio of components a/b is ≥5, alternatively a/b is ≥10, alternatively a/b is ≥20, alternatively a/b is ≥30, or alternatively a/b is ≥40.

Other additives can also be incorporated in the emulsion, such as fillers, foam control agents; anti-freeze agents and biocides.

The present emulsions may be prepared according to the process of the present disclosure as described below.

The present disclosure further provides a process comprising;
I) forming a mixture comprising;
a) 80 to 99.9% by weight of an alkylalkoxysilane of the formula $$R^1{}_a Si(OR^2)_{4-a}$$

b) 0.1 to 20% by weight of a cationic alkoxysilane of the formula $$R^3{}_b R^4 Si(OR^5)_{3-b}$$

c) 0 to 20% by weight of a organopolysiloxane comprising the formula $$(R_2 R^6 SiO_{1/2})_v (R_2 SiO_{2/2})_x (RSiO_{3/2})_y$$

where;
R is a monovalent hydrocarbon group containing 1 to 20 carbons,
$R^1$ is an alkyl group containing 1 to 30 carbon atoms,
$R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
$R^3$ is an alkyl group containing 1 to 4 carbons,
$R^4$ is a monovalent hydrocarbon having at least one quaternary ammonium group substituent,
$R^6$ is an alkyl group containing 1 to 4 carbon atoms or a hydroxy group,
a is 1 or 2,
b is 0, 1 or 2,
v≥0, x≥0, y≥0, with the proviso that not all v, x, and y are zero in the same formula,
II) combining 5 to 95 wt % of the mixture of step I) with 5 to 95 wt % of water to form an aqueous emulsion.

In the process described above, components a), b), and c) are the same as described previously in this disclosure. They are combined in step I to form a mixture. Simple stirring or mixing may be used to form the mixture of step I. Then, 5 to 95 wt % of the resulting mixture is combined with 5 to 95 wt % of water to form an aqueous emulsion. The mixture of these components is typically subjected to mixing or shear in devices such as a rotor stator mixer, a homogenizer, a sonolator, a microfluidizer, a colloid mill, mixing vessels equipped with high speed spinning or with blades imparting high shear, or sonication to effect the formation of the emulsion. While energy-intense mixing or high shear is helpful, one advantage of the present invention is that it is not absolutely required. Low-energy mixing or gentle stir often suffice to achieve an emulsion of the present invention stable for application purpose.

The present microemulsions may be prepared by combining components a), b), and water in various proportions followed by mild mixing. Mixing may be effected by simple stirring or shaking. In some instances, a microemulsion is formed immediately, while in other instances the microemulsion forms upon standing for a period of time. While not wishing to be bound by any theory, the present inventors believe the alkylalkoxysilane and the cationic alkoxysilane may react after mixing in water to form an organosiloxane resinous structure having improved emulsifying abilities vs the alkoxysilane alone, or hydrolyzed version of the silane. Thus, it is sometimes advantageous to mix components a) and b) with water, and allow the resulting mixture to stand for a period of time. Upon standing and optionally re-mixing of the mixture, a microemulsion forms.

The present microemulsions may be prepared by;
I) forming a mixture comprising;
a) 10 to 99.9% by weight of an alkylalkoxysilane of the formula $$R^1{}_a Si(OR^2)_{4-a}$$

b) 0.1 to 90% by weight of a cationic alkoxysilane of the formula $$R^3{}_b R^4 Si(OR^5)_{3-b}$$

where;
$R^1$ is an alkyl group containing 1 to 30 carbon atoms,
$R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
$R^3$ is an alkyl group containing 1 to 4 carbons,
$R^4$ is a monovalent hydrocarbon having at least one quaternary ammonium group substituent,
a is 1 or 2,
b is 0, 1 or 2,
II) combining 5 to 95 wt % of the mixture of step I) with 5 to 95 wt % of water to form an aqueous microemulsion.

In one embodiment, the mixture formed in step I) consists essentially of components a) and b).

Once the microemulsion is formed, other additives can also be incorporated in the microemulsion, such as fillers, foam control agents; anti-freeze agents and biocides.

The present emulsion compositions can be employed in the treatment of various surfaces encompassing concrete and masonry products, textiles, paper, paperboard, leather products, and cellulosic materials. The present emulsions are applied or incorporated into various articles or materials. Examples of leather products are garments, shoes and boots. Textiles include awnings, tents, tarpaulins, rainwear, covers, slickers, canvas, asbestos, fiberglass, natural fibers, peat moss, natural and synthetic yarns, woven and nonwoven materials, carpets and carpet fibers. Cellulosic materials contemplated herein for treatment include wood, wood products, fiberboard, cedar, redwood, firs, plywood, and structural timbers. Concrete and masonry surfaces which may be treated include products and surfaces of heavy and light weight concrete, gypsum, concrete blocks, cinder blocks, soft mud bricks, sand lime bricks, drain tiles, ceramic tiles, sandstone, plaster, clay bricks, natural stones and rocks, roofing tiles, calcium silicate bricks, asbestos cement, slag stones and bricks, stucco, limestone, macadam, marble, grout, mortar, terrazzo, clinker, pumice, terra cotta, porcelain, adobe, coral, dolomite and asphalt. Noncementitious surfaces may be treated with the compositions of the present invention including perlite, cellular glass, vermiculite, mica and diatomaceous earth. Representative of such materials in the examples set forth below are (i) a neutral cementitious sandstone; (ii) a basic cementitious material which was grout; and (iii) a cellulosic material which was wood in the form of pine, redwood and cedar.

In one embodiment, the aqueous emulsion is applied by injecting the emulsion into the construction material. Alternatively, the emulsion may be admixed in the process for preparing the construction material.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Materials
Alkylalkoxysilane 1=n-octyltriethoxysilane, using Dow Corning® Z-6341 as provided (Dow Corning Corporation, Midland Mich.).
Alkylalkoxysilane 2=methyltrimethoxysilane, using Dow Corning® Z-6070 as provided (Dow Corning Corporation, Midland Mich.).
Alkylalkoxysilane 3=propyltrimethoxysilane using Dow Corning® Z-6264 as provided (Dow Corning Corporation, Midland Mich.).
Cationic alkoxysilane=3-(trimethoxysilyl)propyldimethyloctadecyl ammonium chloride using Dow Corning® 5700 (example 1,2), 5772 or 6346 as provided (Dow Corning Corporation, Midland Mich.).
Organopolysiloxane 1=Dow Corning® 3037 Intermediate, (Dow Corning Corporation, Midland Mich.) a dimethyl, Methoxyphenyl Siloxane with Phenyl Silsesquioxane Methoxy-Terminated organopolysiloxane.
Organopolysiloxane 2=Dow Corning® 1-3563 Fluid, (Dow Corning Corporation, Midland Mich.) a hydroxy terminated polydimethylsiloxane having an average viscosity of 72 mm$^2$/s at 25° C.
Organopolysiloxane 3=Dow Corning® 4-2737 Fluid (Dow Corning Corporation, Midland Mich.) a hydroxy terminated polydimethylsiloxane having an average viscosity of 42 mm$^2$/s at 25° C.

Example 1

In a wide-mouth jar was mixed 5 grams of DC® 5700 and 47.9 grams of DC® Z-6341. The mixture was hand shaken and a clear solution was obtained. To the mixture was added 47.5 grams of water. The sample was sonicated using a Misonix Sonicator 3000 Ultrasonic Liquid Processor for 20 seconds on high power. The jar was then capped and toggled and the sonication procedure was repeated twice. This resulted in a milky white emulsion with a monomodal particle size distribution centered around 0.35 microns. The emulsion remained stable without sign of creaming or separation for at least six months.

Example 2

In a wide-mouth jar was mixed 6 grams of DC® 5700 and 10.0 grams of DC® Z-6341. The mixture was hand shaken and a clear solution was obtained. To the mixture was added 36.25 grams of DC® 3037 intermediate and 11.25 grams of DC® 1-3563. The mixture was again hand shaken till homogeneous. 36.50 grams of water was then added. The sample was sonicated using a Misonix Sonicator 3000 Ultrasonic Liquid Processor for 20 seconds on high power. The jar was then capped and toggled and the sonication procedure was repeated twice. This resulted in a milky white emulsion with a monomodal particle size distribution centered around 0.348 microns. The emulsion remained stable without sign of creaming or separation for at least six months.

Example 3

The following blends were prepared. After mixing all components together with a lab mixer, the blends were heated at 50° C. for an hour.

| 5772 | 4-2737 fluid | Z-6341 |
|---|---|---|
| 3.5 | 10 | 86.5 |
| 3.5 | 5 | 91.5 |
| 2 | 10 | 88 |
| 2 | 5 | 93 |
| 1 | 10 | 89 |
| 1 | 5 | 94 |

10% of the aforementioned blends and 90% of water were vigorously mixed with a rotor-stator mixer for one minute (to check) to produce emulsions which are characterized by a 10% solid content.

The emulsion were applied on the 6 faces of pieces of Fiber Reinforced Concrete boards (FRC) (5 cm*5 cm*1 cm). After complete cure of the treatment, the pieces of boards were immersed under water. One untreated sample used as reference was tested as well.

Figure 1:
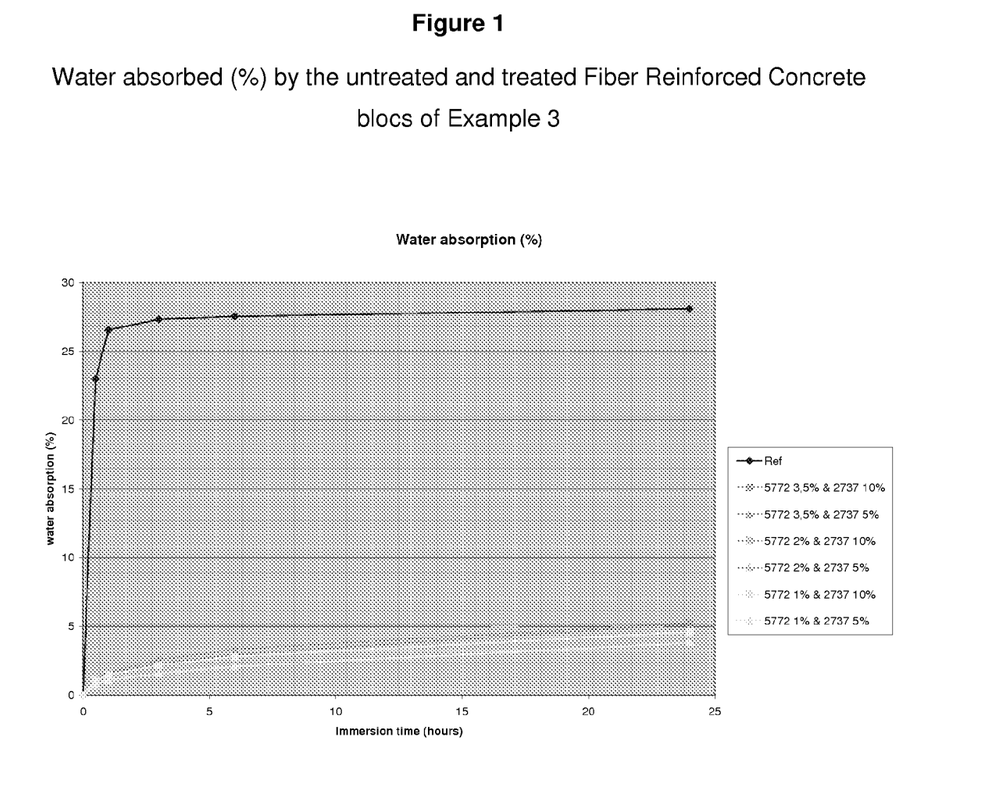
FIG. 1; Water absorbed (%) by the untreated and treated Fiber Reinforced Concrete blocs of Example 3

Dry FRC blocks were weighed ($W_{dry}$) and then immersed for increasing period of time in water, with the top surface of the block at a depth of 3 cm below the water surface. After one hours the block was reweighed ($W_{wet}$). The blocks were then re-immersed for some additional time (to reach an immersion time of 3 hours), and reweighed. The same sequence is then re-applied to reach immersion time of 24 hours. Water absorbed (in %) by the untreated and treated FRC blocs were calculated using of the following equation wherein:

$$\text{Percentage Water Pick Up } (WPU \text{ \%}) = \frac{(W_{wet}) - (W_{dry}) \times 100}{(W_{dry})}$$

and plotted as a function of time as shown in FIG. 1.

Example 4

The following blends were prepared. After mixing all components together with a lab mixer, the blends were heated at 50° C. for an hour.

| 5772 | 4-2737 fluid | Z-6341 |
|------|--------------|--------|
| 5    | 0            | 95     |
| 5    | 4.75         | 90.25  |

A mixture of 54 g of sand, 18 g of cement was introduced into a plastic cup and mixed with a laboratory mixer to homogenize the powder blend. From 0.05 up to 0.2% of liquid additive above (per dry cement+sand weight) were mixed in 9 g of water before introduction into the mixture. The mixing was continued for a further 2 minutes.

The following tests were run on the cementitious materials admixed with the two formulations along with a control sample containing no hydrophobing agent as well.

The dry cementitious powder mixture which had been prepared had sufficient water added thereto and the resulting aqueous mixture for each sample was then poured into a pre-prepared test piece mould. The test piece was removed from the mould after 24 hours and allowed to cure in the lab for a further period of 7 days at a temperature of between 16 to 24° C. and at 100% relative humidity.

After seven days, the test pieces were dried. Dry blocks were weighed ($W_{dry}$) and then immersed for a period of one hour in water, with the top surface of the block at a depth of 3 cm below the water surface. After one hours the block was reweighed ($W_{wet}$). The blocks were then re-immersed for 2 additional hours (to reach an immersion time of 3 hours), and reweighed. The same sequence is then re-applied to reach immersion time of 24 hours.

After the testing, the samples were removed from the water bath, dried in an oven at 50° C. overnight, and submitted to a new immersion test.

Figure 2:
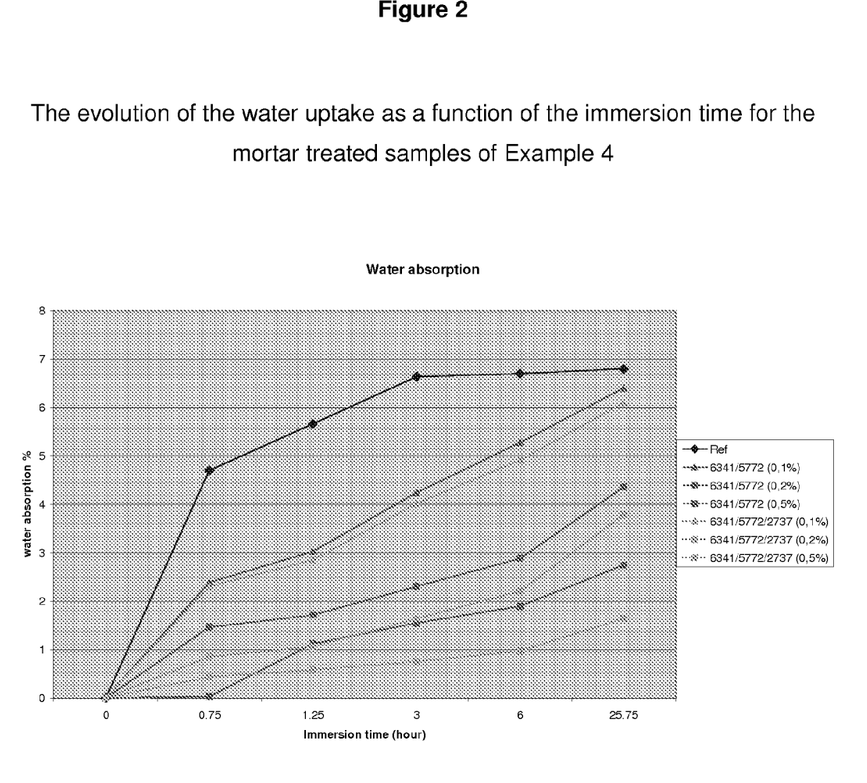
FIG. 2; The evolution of the water uptake as a function of the immersion time for the mortar treated samples of Example 4

FIG. 2 shows the evolution of the water uptake as a function of the immersion time (First and third cycle). The decreased water uptake shows the effective hydrophobic treatment of the mortar when the described formulations are used as admixture.

Example 5

Different silanes where blended with Q9-6346 quaternary ammonium silane using a 98/2 silane/quat silane ratio. These blends were mixed with water under mild mixing conditions such as to reach different final silane content in the final silanes/water mix. The table below gives the different blends prepared. Appearance of the final blend is described upon mixing; observation made within a day.

| Sample | Silane blend        | Water content (g) | Appearance upon mixing |
|--------|---------------------|-------------------|------------------------|
| 1      | 6341/6346 (98/2) 7.5 g | 92.50 g water   | Milky white            |
| 2      | 6341/6346 (98/2) 60 g  | 40 g water      | milky white            |
| 3      | 6070/6346 (98/2) 40 g  | 60 g water      | transparent            |
| 4      | 6070/6346 (98/2) 60 g  | 40 g water      | transparent            |
| 5      | 6264/6346 (98/2) 7.5 g | 92.5 g water    | translucent            |
| 6      | 6264/6346 (98/2) 60 g  | 40 g water      | Milky white            |

Example 6

The same silane/Q9-6346/water blends were used in damp proof coursing application. 1-6184 is a commercially available water repellent used for Damp Proof Coarsing to produce chemical barrier against rising damp in construction, and was tested along with the silane/Q9-6346/water blends for comparison.

Application proceeded by injecting water repellent formulation into holes drilled into construction materials. Diffusion of the water repellent components leads to the formation of a chemical barrier against rising of water by capillarity rise. Some commercial clay-based bricks were broken into two pieces such as to reach dimension of 10·10·6 cm, drilled with holes of either 4 or 7 mm of diameter. Bricks were dried over night in an oven at 50° C. Samples described in this example were injected into the holes (see table). The same active contents were injected throughout the different experiments. Small holes were used for injection of diluted formulations while smaller holes were used for concentrated formulations.

|                  | % active | Hole diameter (cm) | Material Injected (g) |
|------------------|----------|--------------------|-----------------------|
| 1-6184           | 7.5%     | 0.7                | 24                    |
| 6341/6346 (98/2) | 7.5%     | 0.7                | 24                    |
| 6341/6346 (98/2) | 60%      | 0.4                | 3                     |
| 6264/6346 (98/2) | 7.5%     | 0.7                | 24                    |
| 6264/6346 (98/2) | 60%      | 0.4                | 3                     |

After injection of the different formulations, bricks were left for 1 month at room temperature to allow proper diffusion and reaction of the silane into the bricks. After one month, bricks were dried overnight at 40° C. to insure they are dried before the water uptake experiments. Bricks were then placed in a basin filled with 0.5 cm of water. This is enough water to insure capillarity rise through the bricks. Dry bricks were weighed (Wdry) and then immersed for different period of time in a basin filled with 0.5 cm water, with the top surface of the bricks (with the holes) directing upward. After different duration, the bricks were reweighed (Wwet). The bricks were then re-immersed for additional hours (to reach immersion contact time with water as given in the table), and reweighed. The same sequence is then re-applied to reach contact time up to 24 hours. The percentage water pick up was obtained by use of the following equation:

$$\text{Percentage Water Pick Up } (WPU\ \%) = \frac{(Wwet) - (Wdry) \times 100}{(Wdry)}$$

As indicated in the table below, untreated bricks gained around 11% of their weigh by capillarity rise of water and this after only one hour. Any reduction of this water uptake indicates some successful hydrophobic treatment of the bulk of the bricks, which leads to lower affinity of the clay material for water.

| Product              | time | Water uptake (%) |
|----------------------|------|------------------|
| 1-6184 7.5%          | 1 h  | 7.85             |
| comparative          | 2 h  | 7.97             |
|                      | 4 h  | 8.05             |
|                      | 24 h | 8.31             |
| 6341/6346 (98/2)     | 1 h  | 3.52             |
| 7.5%                 | 2 h  | 3.56             |
|                      | 4 h  | 3.59             |
|                      | 24 h | 3.70             |
| 6341/6346 (98/2)     | 1 h  | 4.22             |
| 60%                  | 2 h  | 4.26             |
|                      | 4 h  | 4.31             |
|                      | 24 h | 4.44             |
| 6264/6346 (98/2)     | 1 h  | 7.18             |

-continued

| Product | time | Water uptake (%) |
|---|---|---|
| 7.5% | 2 h | 7.28 |
| | 4 h | 7.34 |
| | 24 h | 7.53 |
| 6264/6346 (98/2) | 1 h | 8.67 |
| 60% | 2 h | 8.74 |
| | 4 h | 8.78 |
| | 24 h | 8.89 |
| reference | 1 h | 12.18 |
| | 2 h | 12.20 |
| | 4 h | 12.27 |
| | 24 h | 12.26 |

Example 7

Figure 3:
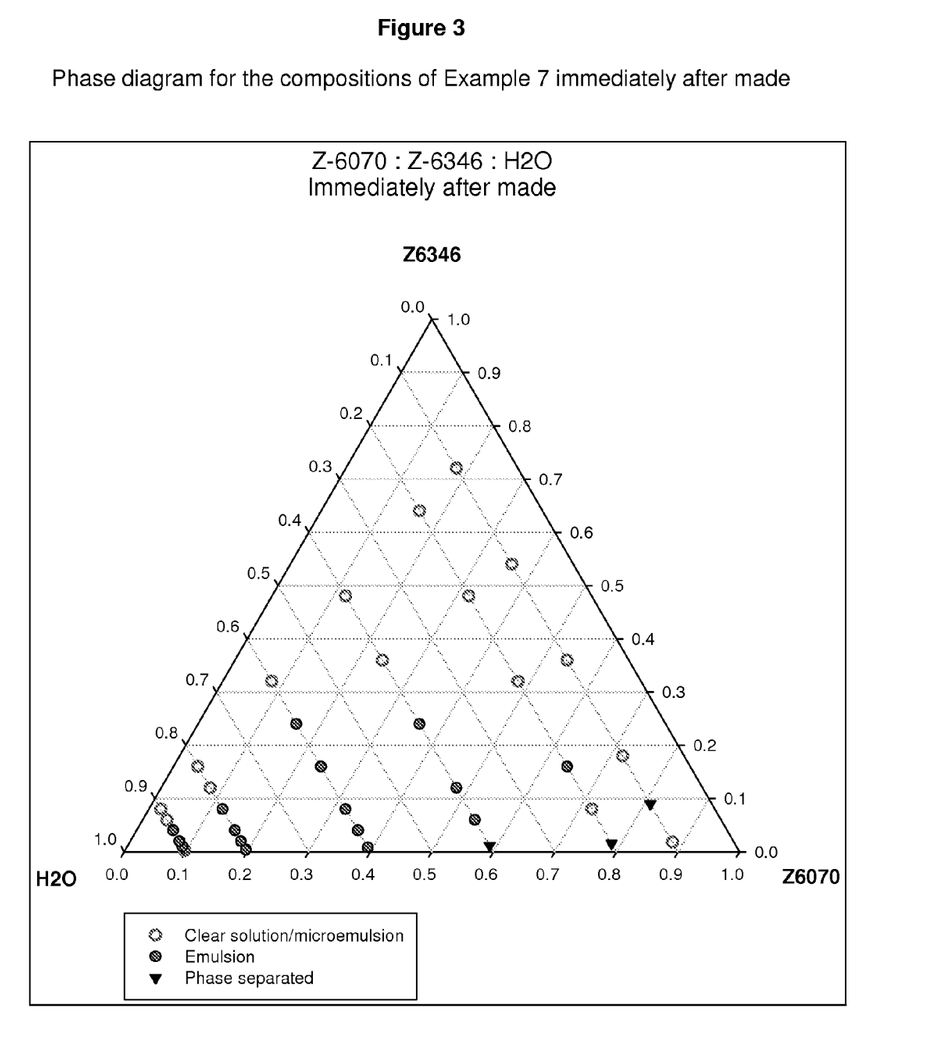
FIG. 3; Phase diagram for the compositions of Example 7 immediately after made FIG. 4; Phase diagram for the compositions of Example 7 one day after made FIG. 5; Phase diagram for the compositions of Example 7 one week after made
Figure 4:
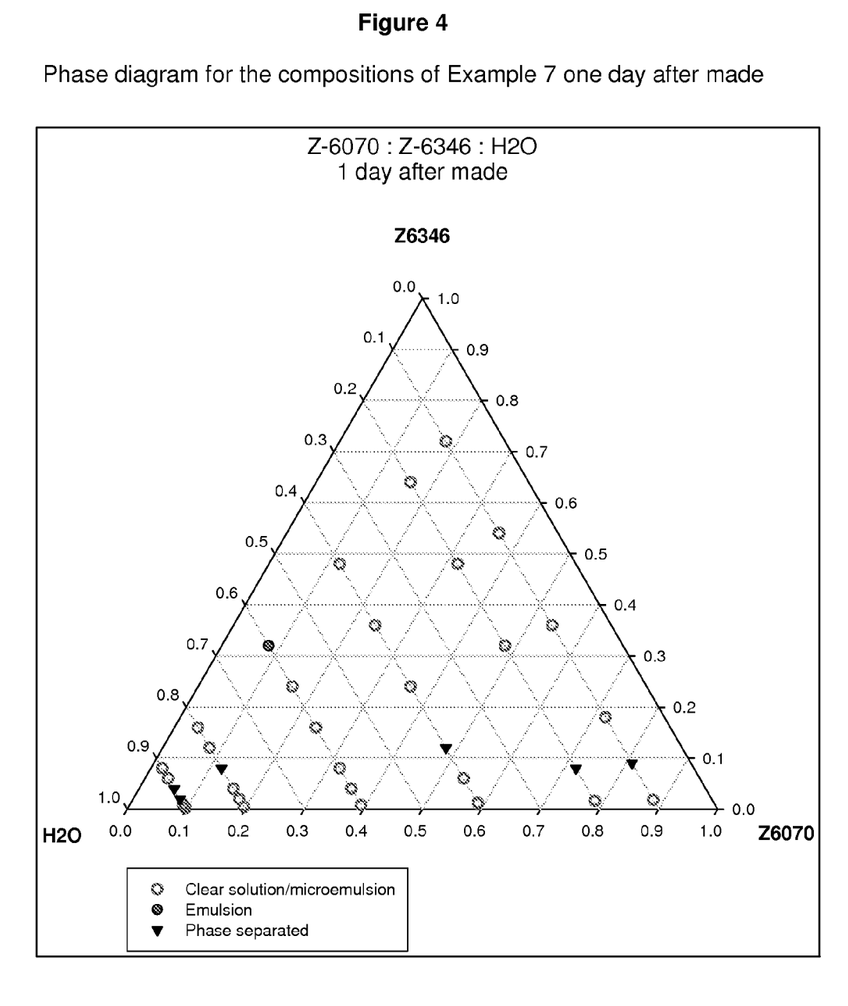
Figure 5:
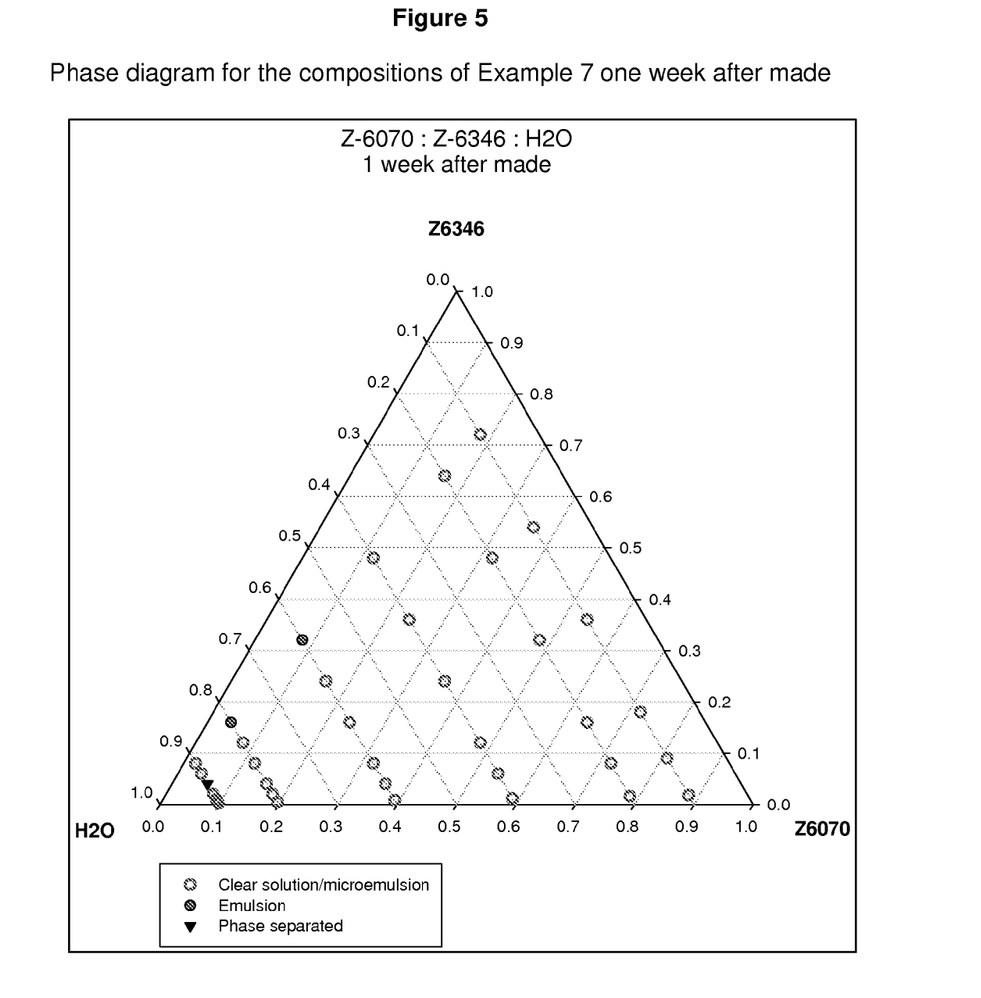

Dow Corning® Z 6070 Silane and Q9-6346 Silane were mixed at various proportions to form stock solutions. Water was added to the silane stock solutions at various ratios to form mixtures of Z6070-Z6356-H20. These mixtures were placed in 16(id)×100(L) mm test tubes, capped and hand shaken till thoroughly mixed. Observations were made i) immediately after liquid steadies, ii) one day after, and iii) 1 week after. Results are presented in the phase diagrams shown as FIGS. 3, 4, and 5, where "emulsion" means a white or cloudy dispersion, "clear solution/microemulsion" means a single phase clear liquid, "creamed or phase separated" means that the mixture displays two layers with a visible interface where each layer can be either clear or cloudy.

Example 8

Figure 6:
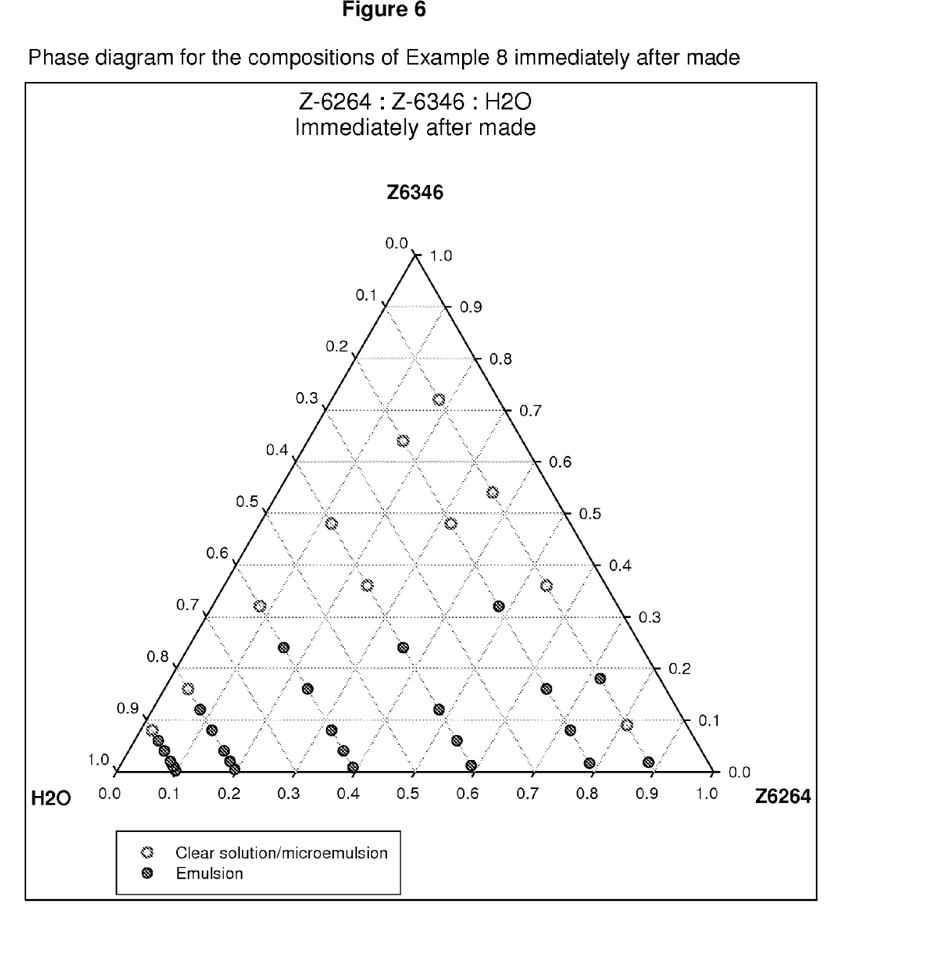
FIG. 6; Phase diagram for the compositions of Example 8 immediately after made FIG. 7; Phase diagram for the compositions of Example 8 one day after made
Figure 7:
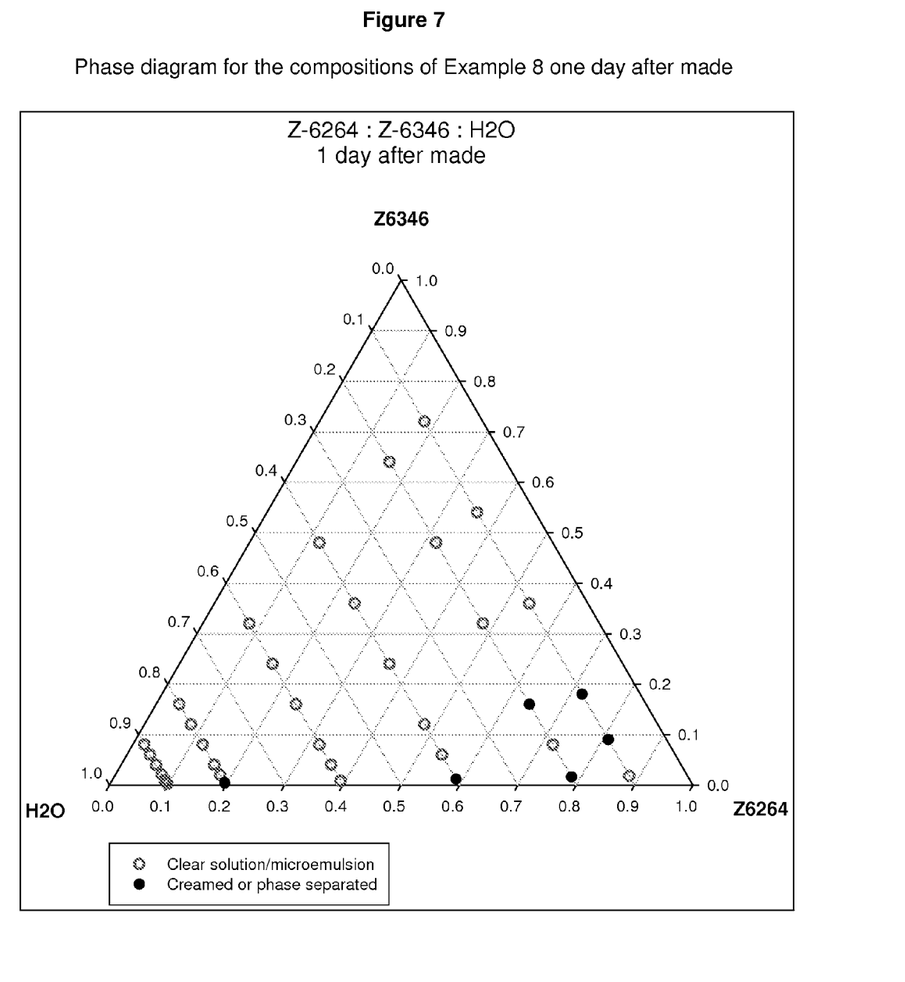
Figure 8:
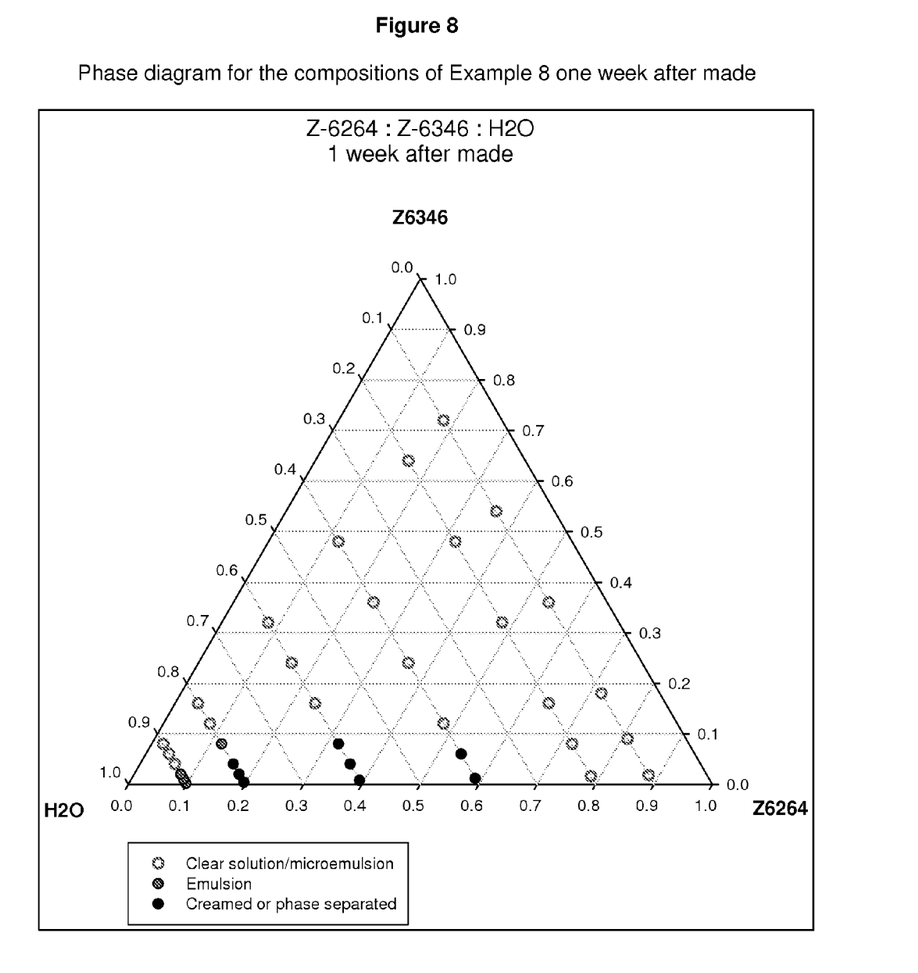
FIG. 8; Phase diagram for the compositions of Example 8 one week after made

Dow Corning® Z 6264 Silane and Q9-6346 Silane were mixed at various proportions to form stock solutions. Water was added to the silane stock solutions at various ratios to form mixtures of Z6264-Z6346-H$_2$O. These mixtures were placed in 16(id)×100(L) mm test tubes, capped and hand shaken till thoroughly mixed. Observations were made i) immediately after liquid steadies, ii) one day after, and iii) 1 week after. Results are presented in the following phase diagrams shown as FIGS. 6, 7, and 8, where "emulsion" means a white or cloudy dispersion, "clear solution/microemulsion" means a single phase clear liquid, "creamed or phase separated" means that the mixture displays two layers with a visible interface where each layer can be either clear or cloudy.

The invention claimed is:

1. An aqueous emulsion comprising:
 a) 1 to 85% by weight of an alkylalkoxysilane of the formula $R^1_a Si(OR^2)_{4-a}$ b) 0.1 to 10% by weight of a cationic alkoxysilane of the formula $R^3_b R^4 Si(OR^5)_{3-b}$ c) up to 20% by weight of a hydroxy terminated polydimethylsiloxane having a degree of polymerization from 1 to 500, said hydroxy terminated polydimethylsiloxane being present in the aqueous emulsion
 where;
  $R^1$ is an alkyl group containing 1 to 30 carbon atoms,
  $R^2$ and $R^5$ are independently selected from the group consisting of hydrogen, alkyl groups containing 1 to 4 carbon atoms, $CH_3C(O)$—, $CH_3CH_2C(O)$—, $HOCH_2CH_2$—, $CH_3OCH_2CH_2$—, $C_2H_5OCH_2CH_2$—,
  $R^3$ is an alkyl group containing 1 to 4 carbons,
  $R^4$ is a monovalent hydrocarbon having at least one quaternary ammonium group substituent,
  a is 1 or 2, b is 0, 1 or 2, and
 wherein;
  the weight ratio of components a/b is ≥4,
  the combined weight of (a), (b) and (c) is no greater than 95% of the emulsion and,
  the emulsion is essentially free of any co-surfactants.

2. The aqueous emulsion of claim 1 where $R^1$ is n-octyl and $R^2$ is ethyl in the alkylalkoxysilane formula.

3. The aqueous emulsion of claim 1 where $R^3$ and $R^5$ is methyl and $R^4$ is —$(CH_2)_3N^+(CH_3)_2C_{18}H_{37}Cl^-$ in the cationic alkoxysilane formula.

4. The aqueous emulsion of claim 1 where the alkylalkoxysilane is n-octyltriethoxysilane, and the cationic alkoxysilane is $(CH_3O)_3Si$—$(CH_2)_3N^+(CH_3)_2C_{18}H_{37}Cl^-$.

5. The aqueous emulsion of claim 1 where the weight ratio of components a/b is ≥5.

6. The aqueous emulsion of claim 1 where the alkylalkoxysilane is methyltrimethoxysilane, and the cationic alkoxysilane is $(CH_3O)_3Si$—$(CH_2)_3N^+(CH_3)_2C_{18}H_{37}Cl^-$.

7. The aqueous emulsion of claim 1 where the alkylalkoxysilane is propyltrimethoxysilane, and the cationic alkoxysilane is $(CH_3O)_3Si$—$(CH_2)_3N^+(CH_3)_2C_{18}H_{37}Cl^-$.

8. A method of waterproofing a surface comprising applying the aqueous emulsion of claim 1 to the surface.

9. The method of claim 8 where the surface is a construction material.

10. The method of claim 9 where the construction material is a concrete, gypsum, or masonry product.

11. The method of claim 9 where the aqueous emulsion is applied by injecting the emulsion into the construction material or admixing the emulsion in the process for preparing the construction material.

12. A process for preparing an aqueous emulsion comprising;
 I) forming a mixture comprising;
  a) 80 to 99.9% by weight of an alkylalkoxysilane of the formula $R^1_a Si(OR^2)_{4-a}$ b) 0.1 to 20% by weight of a cationic alkoxysilane of the formula $R^3_b R^4 Si(OR^5)_{3-b}$ c) up to 20% by weight of a hydroxy terminated polydimethylsiloxane having a degree of polymerization from 1 to 500, said hydroxy terminated polydimethylsiloxane being present in the mixture
 where;
  $R^1$ is an alkyl group containing 1 to 30 carbon atoms,
  $R^2$ and $R^5$ are independently selected from the group consisting of hydrogen, alkyl groups containing 1 to 4 carbon atoms, $CH_3C(O)$—, $CH_3CH_2C(O)$—, $HOCH_2CH_2$—, $CH_3OCH_2CH_2$—, and $C_2H_5OCH_2CH_2$—,
  $R^3$ is an alkyl group containing 1 to 4 carbons,
  $R^4$ is a monovalent hydrocarbon having at least one quaternary ammonium group substituent,
  a is 1 or 2,
  b is 0, 1 or 2,
 II) combining 5 to 95 wt % of the mixture of step I) with 5 to 95 wt % of water to form an aqueous emulsion.

13. The process of claim 12 where the alkylalkoxysilane is octyltriethoxysilane, and the cationic alkoxysilane is $(CH_3O)_3Si$—$(CH_2)_3N^+(CH_3)_2C_{18}H_{37}Cl^-$.

14. The process of claim 12 where the alkylalkoxysilane is propyltrimethoxysilane, and the cationic alkoxysilane is $(CH_3O)_3Si-(CH_2)_3N^+(CH_3)_2C_{18}H_{37}Cl^-$.

15. The aqueous emulsion prepared according to the process of claim 12.

16. An aqueous emulsion consisting essentially of:
   a) 1 to 85% by weight of an alkylalkoxysilane of the formula $R^1{}_aSi(OR^2)_{4-a}$ b) 0.1 to 10% by weight of a cationic alkoxysilane of the formula $R^3{}_bR^4Si(OR^5)_{3-b}$ c) up to 20% by weight of a hydroxy terminated polydimethylsiloxane having a degree of polymerization from 1 to 500, said hydroxy terminated polydimethylsiloxane being present in the mixture
   where;
      $R^1$ is an alkyl group containing 1 to 30 carbon atoms,
      $R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
      $R^3$ is an alkyl group containing 1 to 4 carbons,
      $R^4$ is a monovalent hydrocarbon having at least one quaternary ammonium group substituent,
      a is 1 or 2,
      b is 0, 1 or 2, and
   wherein;
      the weight ratio of components a/b is 4,
      the combined weight of (a), (b) and (c) is no greater than 95% of the emulsion.

17. An aqueous microemulsion comprising:
   a) 1 to 90% by weight of an alkylalkoxysilane of the formula $R^1{}_aSi(OR^2)_{4-a}$ b) 0.1 to 90% by weight of a cationic alkoxysilane of the formula $R^3{}_bR^4Si(OR^5)_{3-b}$ where;
      $R^1$ is an alkyl group containing 1 to 30 carbon atoms,
      $R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
      $R^3$ is an alkyl group containing 1 to 4 carbons,
      $R^4$ is a monovalent hydrocarbon having at least one quaternary ammonium group substituent,
      a is 1 or 2,
      b is 0, 1 or 2,
   wherein;
      the combined weight of (a) and (b) is no greater than 95% of the microemulsion and, the microemulsion is essentially free of any co-surfactants, and the microemulsion is clear or transparent to the naked eye.

18. The aqueous microemulsion of claim 17 where $R^1$ is methyl or propyl, and $R^2$ is methyl in the alkylalkoxysilane formula.

19. The aqueous microemulsion of claim 17 where $R^3$ and $R^5$ is methyl and $R^4$ is $-(CH_2)_3N^+(CH_3)_2C_{18}H_{37}Cl^-$ in the cationic alkoxysilane formula.

20. The aqueous microemulsion of claim 17 where the alkylalkoxysilane is methyl-trimethoxysilane, and the cationic alkoxysilane is $(CH_3O)_3Si-(CH_2)_3N^+(CH_3)_2C_{18}H_{37}Cl^-$.

21. The aqueous microemulsion of claim 17 where the alkylalkoxysilane is propyltrimethoxysilane and the cationic alkoxysilane is $(CH_3O)_3Si-(CH_2)_3N^+(CH_3)_2C_{18}H_{37}Cl^-$.

22. A process for preparing an aqueous microemulsion comprising;
   I) forming a mixture comprising;
      a) 10 to 99.9% by weight of an alkylalkoxysilane of the formula $R^1{}_aSi(OR^2)_{4-a}$ b) 0.1 to 90% by weight of a cationic alkoxysilane of the formula $R^3{}_bR^4Si(OR^5)_{3-b}$ where;
         $R^1$ is an alkyl group containing 1 to 30 carbon atoms,
         $R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
         $R^3$ is an alkyl group containing 1 to 4 carbons,
         $R^4$ is a monovalent hydrocarbon having at least one quaternary ammonium group substituent,
         a is 1 or 2,
         b is 0, 1 or 2,
   II) combining 5 to 95 wt % of the mixture of step I) with 5 to 95 wt % of water to form an aqueous microemulsion, and the aqueous microemulsion is clear or transparent to the naked eye.

23. The process of claim 22 where the alkylalkoxysilane is methyltrimethoxysilane or propyltrimethoxysilane and the cationic alkoxysilane is $(CH_3O)_3Si-(CH_2)_3N^+(CH_3)_2C_{18}H_{37}Cl^-$.

24. The aqueous microemulsion prepared according to the process of claims 22.

25. A method of waterproofing a surface comprising applying the aqueous microemulsion of claim 22 to the surface.

26. The method of claim 25 where the surface is a construction material.

27. The method of claim 25 where the construction material is a concrete, gypsum, or masonry product.

28. The method of claim 25 where the aqueous emulsion is applied by injecting the emulsion into the construction material or admixing the emulsion in the process for preparing the construction material.

29. An aqueous microemulsion consisting essentially of:
   a) 1 to 90% by weight of an alkylalkoxysilane of the formula $R^1{}_aSi(OR^2)_{4-a}$ b) 0.1 to 90% by weight of a cationic alkoxysilane of the formula $R^3{}_bR^4Si(OR^5)_{3-b}$ where;
      $R^1$ is an alkyl group containing 1 to 30 carbon atoms,
      $R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
      $R^3$ is an alkyl group containing 1 to 4 carbons, $R^4$ is a monovalent hydrocarbon having at least one quaternary ammonium group substituent, a is 1 or 2, b is 0, 1 or 2, wherein;

the combined weight of (a) and (b) is no greater than 95% of the microemulsion, and the aqueous microemulsion is clear or transparent to the naked eye.

\* \* \* \* \*